US012346516B1

(12) United States Patent
Livne et al.

(10) Patent No.: US 12,346,516 B1
(45) Date of Patent: Jul. 1, 2025

(54) TOUCH INPUT FORCE ESTIMATION USING MACHINE LEARNING

(71) Applicant: Microsoft Technology Licensing, LLC, Redmond, WA (US)

(72) Inventors: Yael Livne, Tel Aviv (IL); Adam Hakim, Tel Aviv (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/402,316

(22) Filed: Jan. 2, 2024

(51) Int. Cl.
*G06F 3/041* (2006.01)
*G06F 3/044* (2006.01)
*G06N 20/00* (2019.01)

(52) U.S. Cl.
CPC ............ *G06F 3/0416* (2013.01); *G06F 3/044* (2013.01); *G06N 20/00* (2019.01); *G06F 2203/04105* (2013.01)

(58) Field of Classification Search
CPC ......... G06F 2203/04105; G06F 3/0416; G06F 3/044; G06N 20/00
See application file for complete search history.

(56) References Cited

U.S. PATENT DOCUMENTS

| 2016/0179245 | A1 | 6/2016 | Johansson | |
|---|---|---|---|---|
| 2019/0294258 | A1* | 9/2019 | Forlines | G06F 3/0202 |
| 2020/0142582 | A1 | 5/2020 | Quinn | |
| 2022/0202112 | A1 | 6/2022 | Seyed et al. | |
| 2023/0185397 | A1* | 6/2023 | Anzures | H04L 51/066 |
| | | | | 715/739 |

FOREIGN PATENT DOCUMENTS

| WO | 2017007573 A1 | 1/2017 |
|---|---|---|
| WO | 2022039366 A1 | 2/2022 |
| WO | 2022243602 A1 | 11/2022 |

OTHER PUBLICATIONS

Boceck, et al., "Force Touch Detection on Capacitive Sensors using Deep Neural Networks", in Proceedings of the 21st International Conference on Human-Computer Interaction with Mobile Devices and Services, Oct. 2019, 6 Pages.
Extended European Search Report Received in European Patent Application No. 25150104.5, mailed on Feb. 26, 2025, 13 pages.
Li, et al., "Normalize Data component" Retrieved from the URL: https://web.archive.org/web/20231010190149/https://learn.microsoft.com/en-us/azure/machine-learning/component-reference/normalize-data?view=azureml-api-2, Apr. 11, 2021, 04 Pages.

* cited by examiner

*Primary Examiner* — Muhammad N Edun
(74) *Attorney, Agent, or Firm* — Alleman Hall & Tuttle LLP

(57) ABSTRACT

Examples are disclosed herein relating to simulating force-sensing functionality for a touch interface using a machine-learning model that is trained based at least on training data generated by a training touch interface including a plurality of force sensors. In one example, a computing system includes a touch interface configured to output a touch heatmap based at least on touch input detected by a plurality of touch sensors of the touch interface. The computing system is configured to execute a machine-learning model that is configured to receive the touch heatmap, output a force estimation of the touch input based at least on analyzing the touch heatmap, and execute a computing operation based at least on the force estimation. The machine-learning model is trained based at least on training data generated by a training touch interface including a plurality of force sensors.

20 Claims, 7 Drawing Sheets

| 500 | | | | | 502 | | | | | | 410 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | .005 | .009 | .027 | .016 | .005 | 0 | 0 | 0 | 0 |
| 0 | 0 | 0 | .005 | .049 | .071 | .08 | .016 | 0 | 0 | 0 | 0 |
| 0 | 0 | 0 | .005 | .05 | .067 | .074 | .023 | .003 | 0 | 0 | 0 |
| 0 | 0 | 0 | .002 | .025 | .056 | .045 | .006 | 0 | 0 | 0 | 0 |
| 0 | 0 | 0 | .004 | .003 | .005 | .003 | .003 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 5

| FORCE ESTIMATION 420 | | |
|---|---|---|
| CYCLE NUMBER | TOTAL FORCE 604 | FORCE ESTIMATION VECTOR 602 |
| 1 | 0 | \|00\|00\|00\|00\|00\|\| |
| 2 | 62 | \|12\|00\|14\|18\|00\| |
| 3 | 136 | \|26\|01\|33\|39\|03\|31\| |
| ⋮ | ⋮ | ⋮ |
| N | 352 | \|67\|07\|89\|98\|09\|79\| |

FIG. 6

TOUCH INPUT FORCE ESTIMATION USING MACHINE LEARNING

BACKGROUND

In a computing system, a force or pressure sensor can be used with a touch interface, such as a touchpad or a touch-sensitive display, to detect the force of touch input provided to the touch interface. The force of the touch input detected by the force sensor may be used by the computing system to enhance the overall user experience and expand the capabilities of the computing system in several ways. As one example, varying force levels of touch input can be used to control line thickness, shading, and other artistic elements controlled based at least on touch input. As another example, varying force levels of touch input can be used to interact with dynamic user interfaces that respond differently based at least on the force applied, such as different levels of force triggering contextual menus or additional options. As yet another example, in gaming applications, variable force of touch input can be used to control the strength of an action. For example, a light touch might result in a character walking, while a harder press could make the character run.

SUMMARY

Examples are disclosed herein relating to a computing system that simulates force-sensing functionality for a touch interface using a machine-learning model that is trained based at least on training data generated by a training touch interface including a plurality of force sensors. In one example, a computing system includes a touch interface configured to output a touch heatmap based at least on touch input detected by a plurality of touch sensors of the touch interface. The computing system is configured to execute a machine-learning model that is configured to receive the touch heatmap and output a force estimation of the touch input based at least on analyzing the touch heatmap and execute a computing operation based at least on the force estimation. The machine-learning model is trained based at least on training data generated by a training touch interface including a plurality of force sensors. The training data includes a plurality of training touch heatmaps representing a plurality of different instances of training touch input to the training touch interface and a corresponding set of force values output by the plurality of force sensors based at least on the plurality of different instances of training touch input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example touch heatmap output by a touch interface of the computing system shown in FIG. 4.

FIG. 6 shows an example force estimation of touch input output by an example machine-learning model executed by the computing system of FIG. 4.

DETAILED DESCRIPTION

Figure 1B:
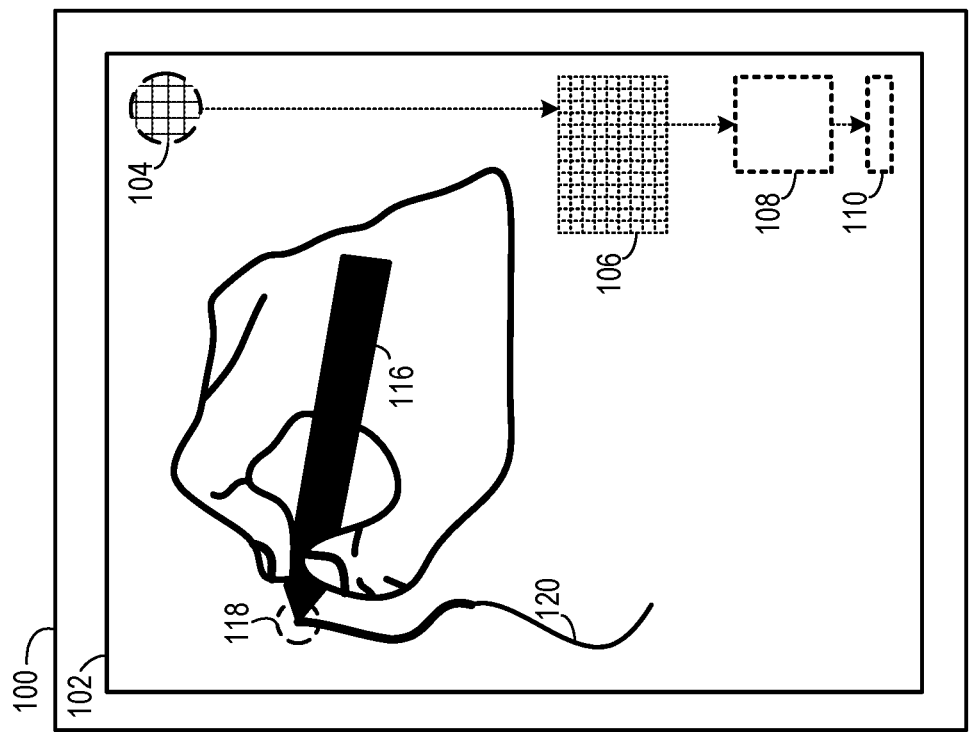
FIGS. 1A, 1B, 2, and 3 schematically show different types of example computing systems that each include a machine-learning model to estimate force of touch input provided to a touch interface of the computing system.

In a computing system, a force or pressure sensor can be used with a touch interface to detect the force of touch input provided to the touch interface. As used herein, a "touch interface" refers to a device that is configured to detect touch input provided to the device, such as a touchpad, a touch-sensitive display, or another type of touch-sensitive device. The force of the touch input detected by the force sensor may be used by the computing system to enhance the overall user experience and expand the capabilities of the computing system. While force-sensitive touch interfaces can offer various benefits, not all touch interfaces have force sensing functionality. Moreover, the inclusion of a force sensor in a computing system to enable force-sensing functionality for a touch interface increases the cost and size of the computing system.

Accordingly, examples are disclosed herein relating to a computing system that simulates force-sensing functionality for a touch interface using a machine-learning model that is trained based at least on training data generated by a training touch interface including a plurality of force sensors. In one example, the computing system includes a touch interface that is configured to output a touch heatmap based at least on touch input detected by a plurality of touch sensors of the touch interface. The computing system is configured to execute a machine-learning model that is configured to receive the touch heatmap and output a force estimation of the touch input based at least on analyzing the touch heatmap and execute a computing operation based at least on the force estimation. The machine-learning model is trained based at least on training data generated by a training touch interface including a plurality of force sensors. The training data includes a plurality of training touch heatmaps representing a plurality of different instances of training touch input to the training touch interface and a corresponding set of force values output by the plurality of force sensors based at least on the plurality of different instances of training touch input.

The technical feature of training the machine-learning model based at least on training data that includes training touch heatmaps and a corresponding set of force values output by a plurality of force sensors of the training touch interface provides the technical benefit of generating force estimations that may be more accurate than other approaches that use a single force sensor to generate training data. For example, the plurality of force sensors may be spatially arranged across the training touch interface, such that different force sensors can measure different levels of force provided by touch input in different regions of the touch interface. Such an arrangement of the plurality of force sensors to accurately measure force of touch input provided to different regions of the touch interface. As a more specific example, in a multi-touch scenario where different fingers provide touch inputs to different regions of the touch interface, different force sensors provide distinct force measurements of touch input provided by the different fingers in the different regions of the touch interface. In contrast, a single force sensor would only provide a single force measurement that less accurately characterizes the level of force of touch inputs provided by the plurality of fingers.

The simulated force-sensing functionality provided by the machine-learning model provides different benefits for different types of computing systems. FIGS. 1A, 1B, 2, and 3 schematically show different types of example computing systems that each include a machine-learning model to estimate force of touch input provided to a touch interface of the computing system.

Figure 1A:
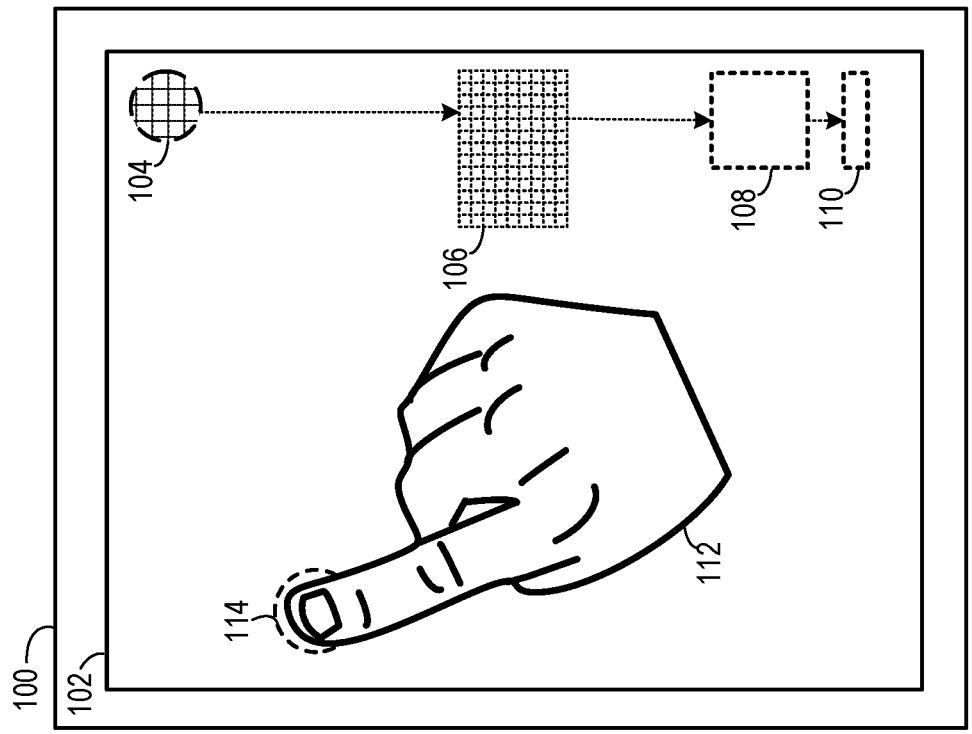

FIGS. 1A and 1B schematically show an example computing system in the form of a tablet computing device 100. The tablet computing device 100 comprises a touch interface in the form of a touch-sensitive display 102. The touch-sensitive display 102 includes a plurality of touch sensors 104. The touch-sensitive display 102 is configured to output a touch heatmap 106 based at least on touch input detected by the plurality of touch sensors 104. The touch heatmap 106 includes a plurality of capacitance values corresponding to the touch input detected by the plurality of touch sensors 104.

In this example, the tablet computing device 100 does not include a force sensor that would detect a force of touch input provided to the touch-sensitive display 102. Instead, the tablet computing device 100 is configured to execute a machine-learning model 108 that is configured to receive the touch heatmap 106 and output a force estimation 110 of the touch input based at least on analyzing the touch heatmap 106. The force estimation 110 provided by the machine-learning model 108 simulates force-sensing functionality that would otherwise be provided by a force sensor. This allows for the force sensor to be omitted from the tablet computing device 100 in order to reduce a size and/or cost of the tablet computing device 100.

The tablet computing device 100 is further configured to execute a computing operation based at least on the force estimation 110 output from the machine-learning model 108. The computing operation may take a variety of different forms depending on the operating conditions of the tablet computing device 100. In FIG. 1A, in one example scenario, a finger 112 provides touch input 114 to the touch-sensitive display 102. The touch-sensitive display 102 outputs the touch heatmap 106 based at least on the touch input 114. The machine-learning model 108 receives the touch heatmap 106 and outputs the force estimation of the touch input 114 based at least on analysis of the touch heatmap 106. The tablet computing device 100 executes a computing operation based at least on the force estimation 110. For example, the computing operation may include controlling a haptic device (not shown) of the tablet computing device 100 to generate a haptic vibration in response to the touch input 114, wherein the intensity of the haptic vibration is dependent on the force estimation 110 of the touch input 114. In other examples, the tablet computing device 100 may perform a different computing operation based at least on the force estimation 110.

In FIG. 1B, in another example scenario, a touch input device 116 (e.g., a passive stylus) provides touch input 118 to the touch-sensitive display 102. The touch-sensitive display 102 outputs the touch heatmap 106 based at least on the touch input 118. The machine-learning model 108 receives the touch heatmap 106 and outputs the force estimation of the touch input 118 based at least on analysis of the touch heatmap 106. The tablet computing device 100 executes a computing operation based at least on the force estimation 110. For example, the computing operation may include controlling the touch-sensitive display 102 to visually present a line 120 that corresponds to a path of the touch input of the touch input device 116. In this example, the thickness of the line 120 varies based at least on the force estimation 110 changing over time as the touch input device 116 provides the touch input 118 to the touch-sensitive display 102.

Figure 2:
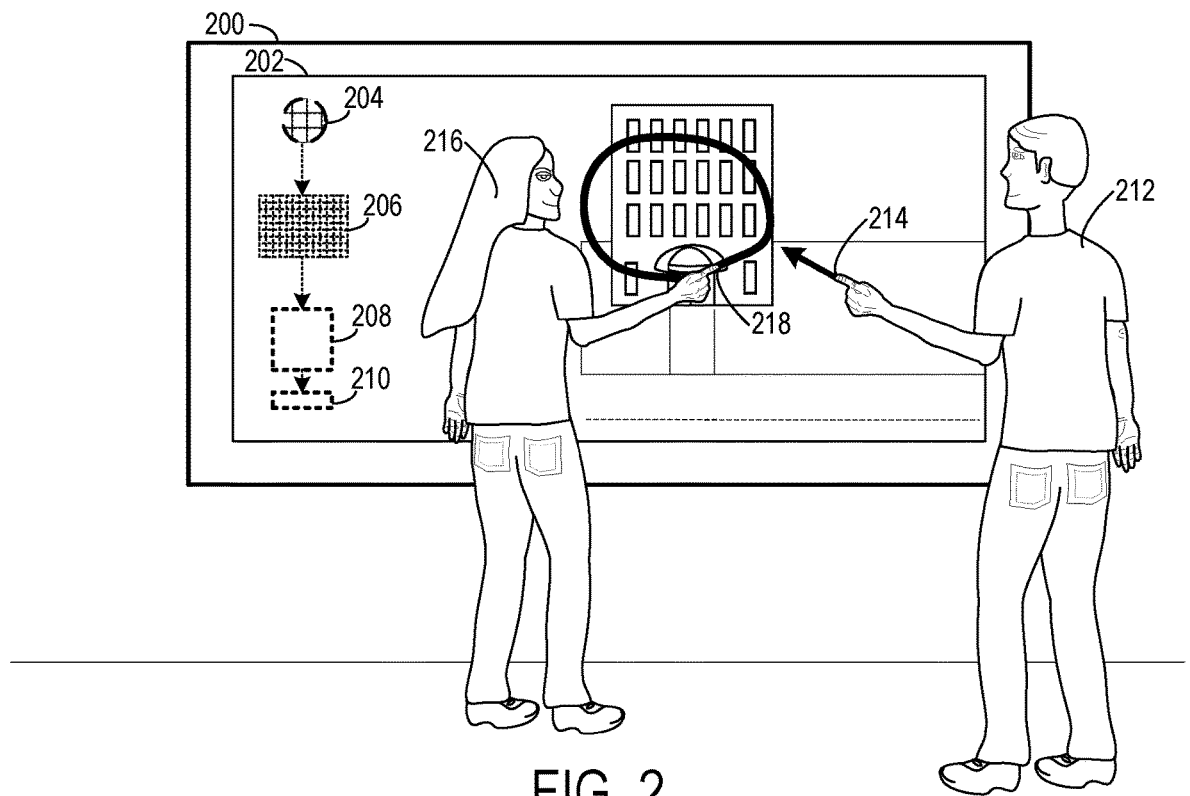

FIG. 2 schematically show another example computing system in the form of a large-format, touch-display computing device 200. The large-format, touch-display computing device 200 comprises a touch interface in the form of a large-format, touch-sensitive display 202. The large-format, touch-sensitive display 202 includes a plurality of touch sensors 204. The large-format, touch-sensitive display 202 is configured to output a touch heatmap 206 based at least on touch input detected by the plurality of touch sensors 204. The touch heatmap 206 includes a plurality of capacitance values corresponding to the touch input detected by the plurality of touch sensors 204.

In this example, the large-format, touch-display computing device 200 does not include a force sensor that would detect a force of touch input provided to the large-format, touch-sensitive display 202. Instead, the large-format, touch-display computing device 200 is configured to execute a machine-learning model 208 that is configured to receive the touch heatmap 206 and output a force estimation 210 of the touch input based at least on analyzing the touch heatmap 206. The force estimation 210 provided by the machine-learning model 208 simulates force-sensing functionality that would otherwise be provided by a force sensor. This allows for the force sensor to be omitted from the large-format, touch-display computing device 200 in order to reduce a cost of the large-format, touch-display computing device 200.

In this example, multiple users are providing touch input to the large-format, touch-display computing device 200 at the same time in a multi-touch scenario. In particular, a first user 212 provides a first touch input 214 in a first region of the large-format, touch-display computing device 200. A second user 216 provides a second touch input 218 in a second, different region of the large-format, touch-display computing device 200. The machine-learning model 208 is trained based at least on training data generated by a training touch interface including a plurality of force sensors that are spaced apart across different regions of the training touch interface. By training the machine-learning model 208 in this manner, the machine-learning model 208 is able to accurately simulate force measurements in different regions of the large-format, touch-sensitive display 202 provided by different users based at least on analyzing the touch heatmap 206. In contrast, a machine-learning model trained based at least on training data including pressure measurements from a single pressure sensor would be unable to accurately simulate force measurements in such a multi-touch scenario.

The large-format, touch-display computing device 200 is further configured to execute a computing operation based at least on the force estimation 210 output from the machine-learning model 208. The computing operation may take a variety of different forms depending on the operating conditions of the large-format, touch-display computing device 200. In this example, the computing operation includes controlling the large-format, touch-sensitive display 202 to visually present a line that corresponds to a path of the touch input 214 provided by the first user 212. Further, the computing operation includes controlling the large-format, touch-sensitive display 202 to visually present a circle that corresponds to a path of the touch input 218 provided by the second user 216. In each case, the thickness of each of the lines varies based at least on the force estimation 110 changing over time as the touch inputs provided by the different users 212, 216 change. Note that the force estimation 110 accurately distinguishes between the different touch inputs provided by the different users 212, 216 and accurately estimates separate forces of the different touch inputs provided by the different users 212, 216.

Figure 3:
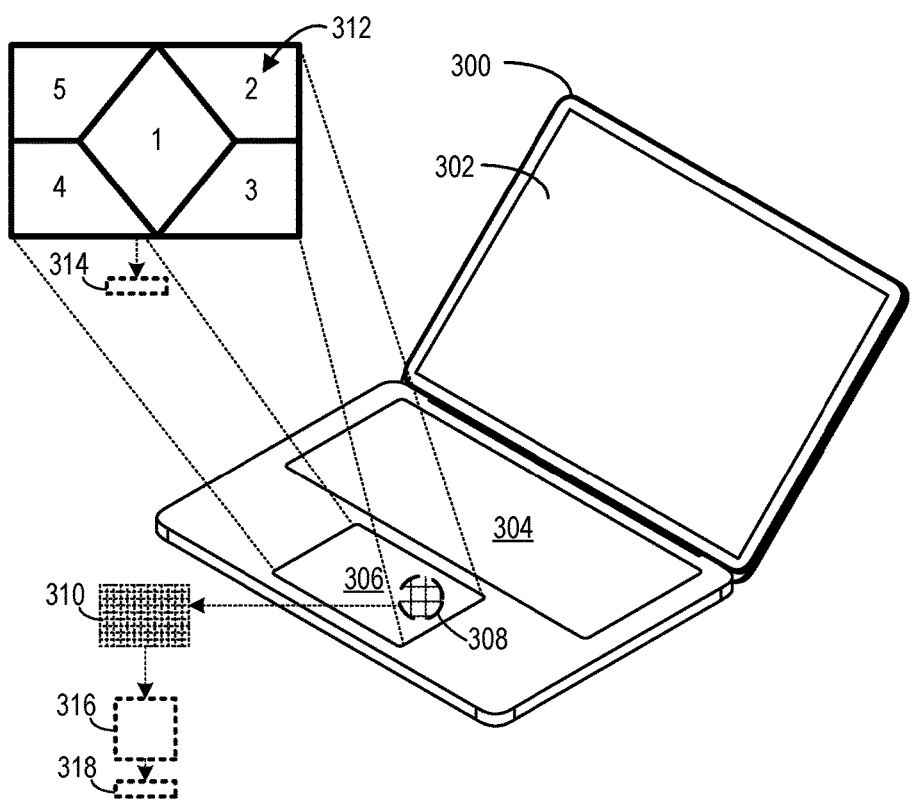

In the above examples, the computing systems 100 and 200 do not include force sensors and instead use the respective machine-learning models 108, 208 to simulate force-sensing functionality that would otherwise be provided by a force sensor. In other examples, a computing system may employ a machine-learning model to estimate the force of touch input even though the computing system includes a force sensor. FIG. 3 schematically show another example computing system in the form of a laptop computing device 300. The laptop computing device 300 includes a display 302, a keyboard 304, and a touchpad 306. The touchpad 306 includes a plurality of touch sensors 308 configured to detect touch input to the touchpad 306 and output a touch heatmap 310 based at least on touch input detected by the plurality of touch sensors 308. The touch heatmap 310 includes a plurality of capacitance values corresponding to the touch input detected by the plurality of touch sensors 308. The touch heatmap 310 output by the touchpad 306 may be utilized to control an aspect of the laptop computing device 300, such as a state of a mouse pointer that is visually presented via the display 302, for example.

The touchpad 306 further includes a plurality of force sensors 312 spatially distributed across the touchpad 306 and configured to detect the force of touch input provided to the touchpad 306. In the illustrated example, the touchpad 306 includes five force sensors that are spatially distributed across the touchpad 306. In other examples, the touchpad 306 may include a different number of force sensors. Each of the force sensors 312 is configured to detect the force of touch input provided to a different region of the touchpad 306. The plurality of force sensors 312 are collectively configured to detect different forces of different touch inputs provided to the touchpad 306 in a multi-touch scenario. The plurality of force sensors 312 are configured to output a force measurement 314 based at least on touch input detected by the plurality of force sensors 312. In some examples, the force measurement 314 may include a vector of force values corresponding to the number of the force sensors 312. In some examples, the force measurement 314 may include a total force that represents a combination of force values output by the plurality of force sensors 312.

Over time, the responses of one or more of the plurality of force sensors 312 to force may drift, which may cause the plurality of force sensors 312 to require calibration. Accordingly, in this example, the laptop computing device 300 utilizes a machine-learning model 316 to calibrate the plurality of force sensors 312. The laptop computing device 300 is configured to execute the machine-learning model 316. The machine-learning model 316 is configured to receive the touch heatmap 310 and output a force estimation 318 of the touch input provided to the touchpad 306 based at least on analyzing the touch heatmap 310. The laptop computing device 300 is configured to compare the force measurement 314 output by the plurality of force sensors to the force estimation 318 output by the machine-learning model 316. The laptop computing device 300 is configured to, based at least on a difference value representing a difference between the force measurement 314 and the force estimation 318 being greater than a threshold difference value, adjust one or more calibration parameters of the plurality of touch sensors 312 based at least on the difference value to increase the accuracy of the force measurements 314 output by the touch interface based at least on touch input to the touch interface.

For example, the calibration parameters of the plurality of force sensors 312 may include offset values and sensitivity values. The offset values represent the force measurement when there is no force applied to the touchpad 306. The offset values are used to correct any bias in the force sensor's measurements. The sensitivity values, also known as scale factors, represent the change in output for a unit change in force. The sensitivity values indicate how much the force sensor's output should change for a given change in force of touch input. Sensitivity adjustments are made to ensure that the force sensors provide accurate readings across an entire measurement range of the force sensors. The calibration process performed by the laptop computing device 300 aims to minimize errors and ensure the force sensors 312 provides accurate and reliable measurements. In other examples, the above-described calibration process may be performed by other types of computing systems that include force sensors.

Figure 4:
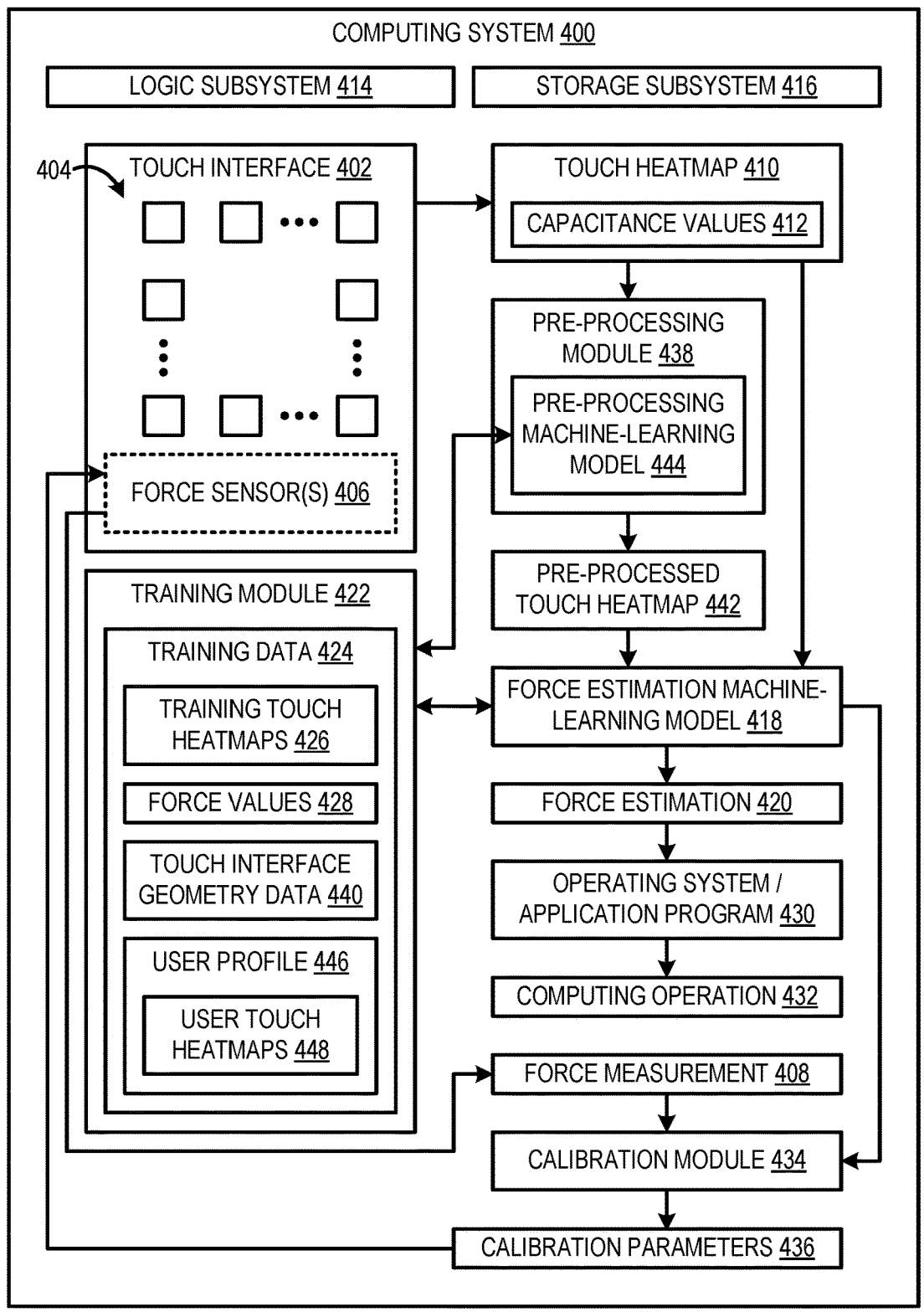
FIG. 4 is a computer architecture diagram of an example computing system of the present disclosure.

FIG. 4 shows a computer architecture diagram of an example computing system 400 of the present disclosure. For example, the computing system 400 may represent the tablet computing device 100 of FIG. 1, the large-format, touch-display computing device 200 of FIG. 2, and the laptop computing device 300 of FIG. 3. Other examples of the computing system 300 include smartphones and other computing systems with a touch interface, such as a touch pad and/or a touch-sensitive display.

The computing system 400 comprises a touch interface 402 including a plurality of touch sensors 404 configured to detect touch input to the touch interface 402. In some examples, the touch interface 402 is a touch-sensitive display without a force sensor. In other examples, the touch interface 402 is a touchpad without a force sensor. In yet other examples, the touch interface 402 optionally may include one or more force sensors 406. The one or more force sensors 406 are configured to output a force measurement 408 of touch input provided to the touch interface 402.

The touch interface 402 is configured to output a touch heatmap 410 based at least on touch input detected by the plurality of touch sensors 404. The touch heatmap 410 includes a plurality of capacitance values 412 corresponding to the touch input detected by the plurality of touch sensors 404. FIG. 5 shows a visual representation of the touch heatmap 410 in the form of a two-dimensional matrix of capacitance values 500. The number of capacitance values 500 corresponds to a number of touch sensors 404 of the touch interface 402. Each capacitance value may have a desired bit depth suitable to quantify a degree of touch input provided to the touch interface 402. In this example, a touch input 502 is characterized by non-zero capacitance values in the touch heatmap 410. The magnitudes of the capacitance values correspond to the degree or intensity of touch or contact with the touch interface 402. Capacitance values having greater magnitudes indicate a greater degree of touch or contact and capacitance values with lesser magnitudes indicate a lesser degree of touch or contact. Capacitance values of zero indicate no touch or contact. In some examples, the capacitance values also may vary based at least on a type of object providing the touch input to the touch sensor (e.g., finger, stylus, drinking glass, game piece, alphabet letter).

Returning to FIG. 4, the computing system 400 comprises a logic subsystem 414 and a storage subsystem 416 holding instructions executable by the logic subsystem 414 to execute computing operations to control a state of the computing system 400. More particularly, the storage subsystem 416 holds instructions executable by the logic subsystem 414 to execute a force-estimation machine-learning model 418 configured to receive the touch heatmap 410 and output a force estimation 420 of the touch input detected by the plurality of touch sensors 404 of the touch interface 402 based at least on analyzing the touch heatmap 410. The force-estimation machine-learning model 418 may take a form that is suitable for the particular application of analyzing touch heatmaps in order to predict estimations of the force of touch input provided to a touch interface. In some examples, the force-estimation machine-learning model 418 comprises a convolutional neural network. In other examples, the force-estimation machine-learning model 418 comprises a fully-connected neural network. In other examples, the force-estimation machine-learning model 418 comprises another type of neural network. Example machine learning models are described in more detail below.

The storage subsystem 416 holds instructions executable by the logic subsystem 414 to execute a training module 422. The training module 422 is configured to train the force-estimation machine-learning model 418 based at least on training data 424 generated by a training touch interface including a plurality of force sensors spatially distributed across the training touch interface, such as the laptop computing device 300 of FIG. 3 or another type of computing system that includes a touch interface including a plurality of force sensors. The training data 424 includes a plurality of training touch heatmaps 426 representing a plurality of different instances of training touch input to the training touch interface. For example, the different instances of training touch input may include different touch inputs from different objects (e.g., finger, stylus, drinking glass, game piece, alphabet letter) in different positions on the touch interface. In some examples, the training touch input may include touch input from different hands of different people having different hand sizes, such as training touch input provided by fingers of children and fingers of adults. In some examples, the training touch input may include multi-touch scenarios, such as fingers of different users, a finger and a stylus, and other types of multi-touch scenarios.

The training data 424 further includes a set of force values 428 output by the plurality of force sensors of the training touch interface based at least on the plurality of different instances of training touch input. The set of force values 428 quantify the degree of force provided by the training touch input. By training the force-estimation machine-learning model 418 based at least on the training touch heatmaps 426 and the corresponding set of force values 428 of the plurality of different force sensors, the force-estimation machine-learning model 418 is able to generate a force estimation 420 that may be more accurate than other approaches that use a single force sensor to generate training data. This may be particularly beneficial for accurately estimating forces of multiple touch inputs to the touch interface 402 in a multi-touch scenario. The force-estimation machine-learning model 418 may be trained using a suitable training method. In some examples where the force-estimation machine-learning model 418 comprises a feed-forward neural network, the force-estimation machine-learning model 418 can be trained using backpropagation as a training method, using any suitable cost function. In other examples, other training methods may be used to train the force-estimation machine-learning model 418.

The force estimation 420 output by the force-estimation machine-learning model 418 may take any suitable form. FIG. 6 shows a visual representation of the force estimation 420 of touch input provided output by the force-estimation machine-learning model 418, according to one example. The force estimation 420 is output repeatedly from the force-estimation machine-learning model 418 on a per cycle basis. The force-estimation machine-learning model 418 may output the force estimation 420 according to any suitable cycle rate. In some examples, the cycle rate of the force-estimation machine-learning model 418 may be synchronized with a cycle rate of the plurality of touch sensors 404 of the touch interface. In some examples, the force estimation 420 comprises an N-length vector 602 of estimated force values, where N is the number of force sensors included in the training touch interface. In the illustrated example, the vector 602 includes five estimated force values corresponding to five different force sensors. For example, the five different source sensors may correspond to the arrangement of the plurality of force sensors 312 of the laptop computing device 300 of FIG. 3. The N-length vector 602 of estimated force values may be beneficial for implementations where force is estimated in different regions of the touch interface, such as in multi-touch scenarios, so that the forces of different touch inputs to different regions of the touch interface can be accurately estimated on an individual basis. In some examples, the force estimation 420 comprises a total estimated force value 604 that represents a combination of force values that would be output by the plurality of force sensors of the training touch interface based at least on the touch input being provided to the training touch interface. The total estimated force value 604 may be beneficial for implementations where a single force values is accepted, such as in some legacy application programs that were designed for use with a single touch sensor. The force estimation 420 output by the force-estimation machine-learning model 418 may have any suitable format.

Returning to FIG. 4, the storage subsystem 416 holds instructions executable by the logic subsystem 414 to execute an operating system/application programs 430. The operating system/application programs 430 are configured to receive the force estimation 420 from the force-estimation machine-learning model 418 and execute a computing operation 432 based at least on the force estimation 420. The computing operation 432 may take any suitable form. In some examples, the computing operation 432 comprises a feedback operation that provides feedback in response to the touch input to the touch interface 402. Returning to the example shown in FIG. 1A, the computing operation 432 may include controlling a haptic device of the tablet computing device 100 to generate a haptic vibration in response to the touch input 114, wherein the intensity of the haptic vibration is dependent on the force estimation of the touch input. In other examples, the feedback operation may provide visual feedback. Returning to the example shown in FIG. 1B, the computing operation may include controlling the touch-sensitive display 102 of the tablet computing device 100 to visually present a line 120 that corresponds to a path of the touch input of the touch input device 116, where the thickness of the line 120 varies based at least on the force estimation changing over time as the touch input device 116 provides the touch input 118 to the touch-sensitive display 102. In other examples, the computing operation 432 may adjust a state of a display of the computing system 400 in another manner. In still other examples, the computing operation 432 may adjust a state of other components of the computing system 400.

In some implementations where the touch interface 402 includes the plurality of force sensors 406, the storage subsystem 416 holds instructions executable by the logic subsystem 414 to execute a calibration module 434 that is configured to calibrate the plurality of force sensors 406. More particularly, the calibration module 434 is configured to receive the force measurement 408 output from the plurality of force sensors 406 generated based at least on touch input to the touch interface 402. Further, the calibration module 434 is configured to receive the force estimation 420 output from the force-estimation machine-learning module 418 based at least on the touch input to the touch interface 402. The calibration module 434 is configured to compare the force measurement 408 with the force estimation 420 and based at least on a difference value representing a difference between the force measurement 408 and the force estimation 420 being greater than a threshold difference value, adjust one or more calibration parameters 436 of the touch interface 402 based at least on the difference value to increase the accuracy of the force measurements 408 output by the plurality of force sensors 406 based at least on the touch input to the touch interface 402. For example, the calibration parameters 436 may include offset values and sensitivity values.

In some implementations, the storage subsystem 416 holds instructions executable by the logic subsystem 414 to execute a pre-processing module 438. The pre-processing module 438 is configured to pre-process the touch heatmap 410 prior to being sent to the force-estimation machine-learning model 418. In particular, the pre-processing module 438 is configured to geometrically map the touch heatmap 410 to the training touch interface used to generate the training data 424 to generate a pre-processed touch heatmap 442 that is spatially registered to the training touch interface. For example, the touch interface geometry data 440 may include a resolution of the training touch interface, dimensions of the training touch interface, and/or other geometric parameters of the training touch interface. The pre-processed touch heatmap 442 may produce a more accurate force estimation relative to the touch-heatmap 410, because the pre-processed touch heatmap 442 is more spatially aligned with the training touch heatmaps 426 produced by the training touch interface.

In some implementations, the storage subsystem 416 holds instructions executable by the logic subsystem 414 to execute a pre-processing machine-learning model 444 configured to receive the touch heatmap 410, perform the geometric mapping of the touch heatmap 410 to the training touch interface to generate the pre-processed touch heatmap 442, and output the pre-processed touch heatmap 442. In some examples, the pre-processing machine-learning model 444 may be trained by the training module 422 based at least on the training data 424 including the touch interface geometry data 440 of the training touch interface. Using the pre-processing machine-learning model 444 to perform the pre-processing operations provides the technical benefit that the pre-processing machine-learning model can be trained to automatically perform geometric mapping for a variety of different touch interfaces having different geometric parameters to map to the training touch interface.

In implementations where the pre-processing module 438 is executed, the force-estimation machine-learning model 418 is configured to receive the pre-processed touch heatmap 442 and output the force estimation 420 based at least on analyzing the pre-processed touch heatmap 442.

In some implementations, the force-estimation machine-learning model 418 may be re-trained by the training module 422 based at least on touch input provided by a particular user so as to more accurately estimate the force of the touch input provided by the particular user to the touch interface 402. In one example, the touch interface 402 is configured to output a plurality of touch heatmaps corresponding to a plurality of instances of touch input to the touch interface 402, and the storage subsystem 416 holds instructions executable by the logic subsystem 414 to associate the plurality of touch heatmaps with a user profile 446 stored in the storage subsystem 416. For example, the user profile 446 may be associated with a primary user of the computing system 400. The touch heatmaps associated with the user profile 446 may be referred to as user touch heatmaps 448. The user touch heatmaps 448 may be included in the training data 424. The training module 422 may be configured to re-train the force-estimation machine-learning model 418 based at least on the plurality of user touch heatmaps 448 associated with the user profile 446 to increase the accuracy of the force estimation 408 output by the force-estimation machine-learning model 418 based at least on analyzing a touch heatmap generated from touch input provided to the touch interface 402 by the user associated with the user profile 446.

Figure 7A:
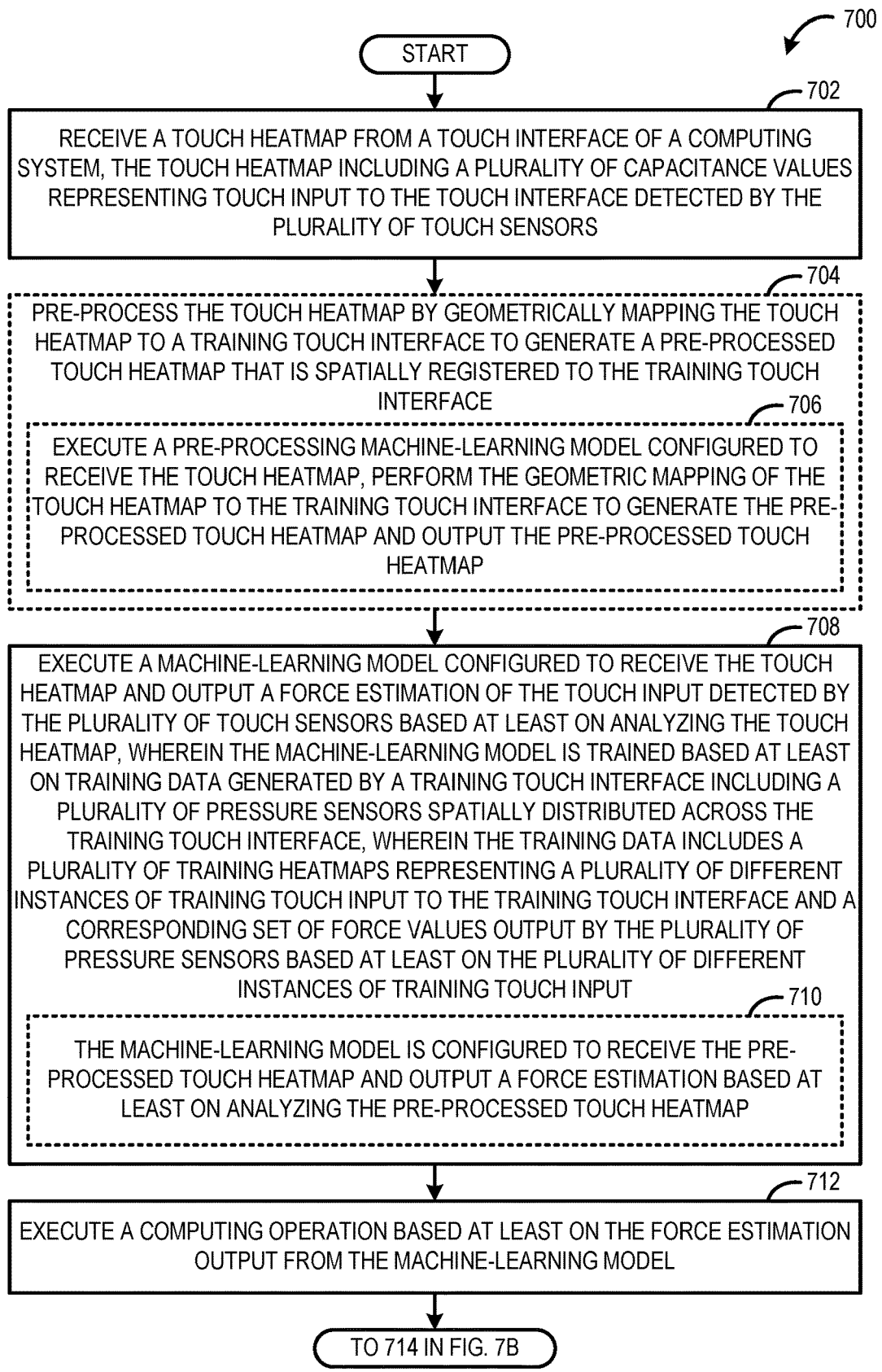
FIGS. 7A-7B show a flowchart illustrating an example method for controlling operation of the computing system of FIG. 4 based on a force estimation output by the machine-learning model.
Figure 7B:
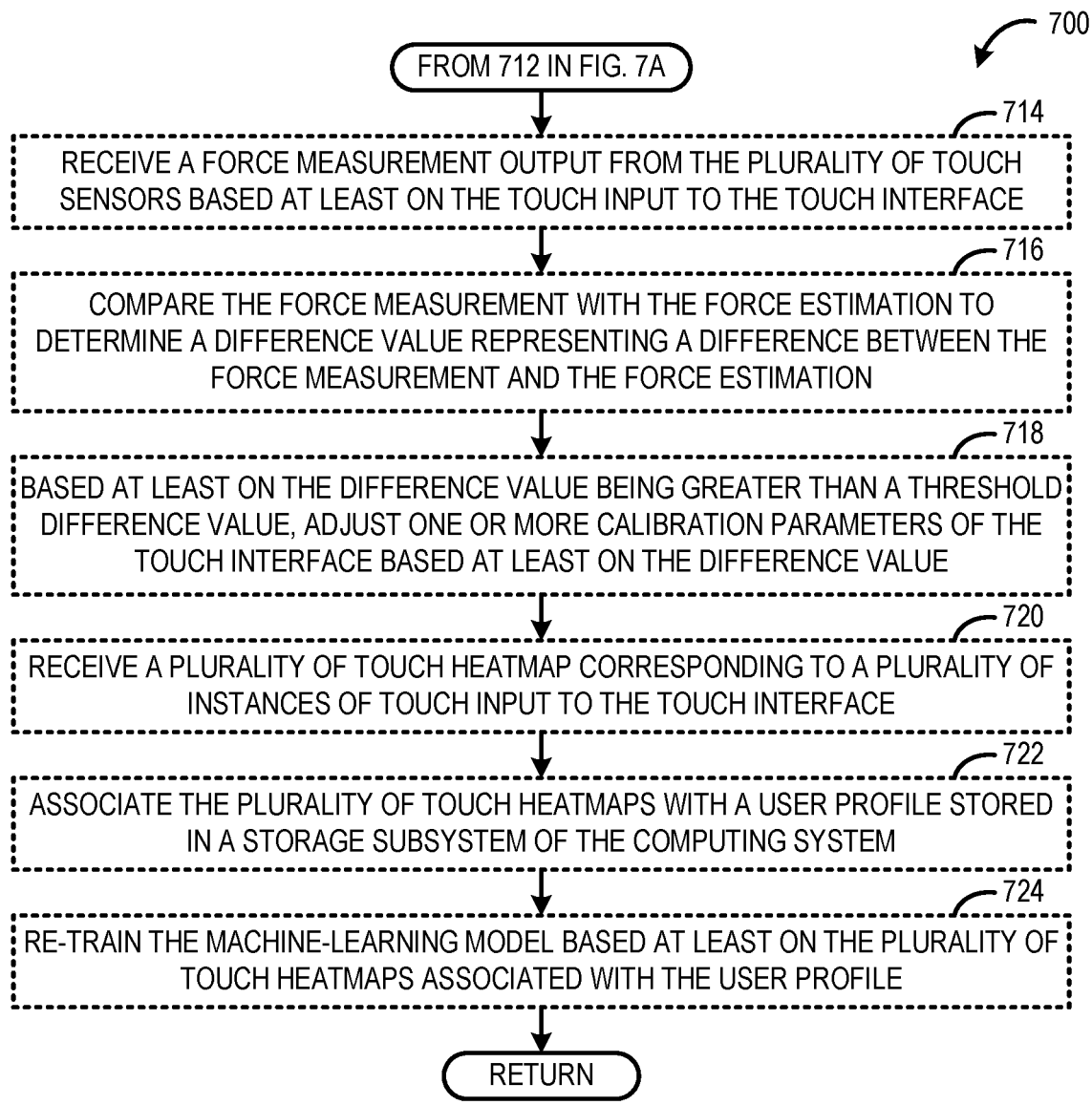

FIGS. 7A-7B show an example method 700 for controlling operation of a computing system based on a force estimation output by the force-estimation machine-learning model 418. For example, the method 700 may be performed by the tablet computing device 100 of FIGS. 1A and 1B, the large-format, touch-display computing device 200 of FIG. 2, the laptop computing device 300 of FIG. 3, the computing system 400 of FIG. 4, or another type of computing system. Processes of method 700 depicted in dashed lines optionally may be performed in some implementations.

At 702, the method 700 includes receiving a touch heatmap from a touch interface of the computing system. The touch interface includes a plurality of touch sensors. The touch heatmap includes a plurality of capacitance values representing touch input to the touch interface detected by the plurality of touch sensors. In some examples, the touch interface does not include a force sensor. In other examples, the touch interface includes a plurality of force sensors.

In some implementations, at 704, the method 700 may include pre-processing the touch heatmap by geometrically mapping the touch heatmap to the training touch interface to generate a pre-processed touch heatmap that is spatially registered to the training touch interface. Such geometric mapping provides the technical benefit of allowing for different types of touch interfaces having different geometries to be spatially aligned with the geometry of the training touch interface, so that force estimations output by machine-learning model accurately represent the geometry of the particular type of touch interface included in the computing system.

In some implementations, at 706, the method 700 may include executing a pre-processing machine-learning model configured to receive the touch heatmap, perform the geometric mapping of the touch heatmap to the training touch interface to generate the pre-processed touch heatmap and output the pre-processed touch heatmap.

At 708, the method 700 includes executing a machine-learning model configured to receive the touch heatmap and output a force estimation of the touch input detected by the plurality of touch sensors based at least on analyzing the touch heatmap. The machine-learning model is trained based at least on training data generated by a training touch interface including a plurality of force sensors spatially distributed across the training touch interface. The training data includes a plurality of training touch heatmaps representing a plurality of different instances of training touch input to the training touch interface and a corresponding set of force values output by the plurality of force sensors based at least on the plurality of different instances of training touch input. By training the machine-learning model based at least on training data that includes the training touch heatmaps and the corresponding set of force values output by the plurality of force sensors of the training touch interface, the machine-learning model may output force estimations that may be more accurate than other approaches that use a single force sensor to generate training data, especially in multi-touch scenarios.

In some implementations where the pre-preprocessed touch heatmap is generated, at 710, the machine-learning model is configured to receive the pre-processed touch heatmap and output a force estimation based at least on analyzing the pre-processed touch heatmap. By analyzing the pre-processed touch heatmap that is spatially aligned mapped to the geometric features of the training touch interface, the machine-learning model may output a more accurate force estimation of the touch input provided to the touch interface of the computing system relative to a force estimation output based at least on analyzing the touch heatmap that is not pre-processed.

At 712, the method 700 includes executing a computing operation based at least on the force estimation output from the machine-learning model.

In FIG. 7B, in some implementations where the touch interface includes a plurality of force sensors, at 714, the method 700 may include receiving a touch measurement from output from the plurality of force sensors based at least on the touch input to the touch interface. In some implementations, at 716, the method 700 may include comparing the force measurement with the force estimation to determine a difference value representing a difference between the force measurement and the force estimation. In some implementations, at 718, the method 700 may include, based at least on the difference value being greater than a threshold difference value, adjust one or more calibration parameters of the touch interface based at least on the difference value. By adjusting the one or more calibration parameters of the touch interface in this manner, the accuracy of the force measurement output by the plurality of force sensors may be increased.

In some implementations, at 720, the method 700 may include receiving a plurality of touch heatmaps corresponding to a plurality of instances of touch input to the touch interface. In some implementations, at 722, the method 700 may include associating the plurality of touch heatmaps with a user profile stored in a storage subsystem of the computing system. In some implementations, at 724, the method 700 may include re-training the machine-learning model based at least on the plurality of touch heatmaps associated with the user profile. By re-training the machine-learning model in this manner, the accuracy of the force estimates output by the re-trained machine-learning model based at least on analyzing heatmaps generated from touch input to the touch interface provided by the user may be increased.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
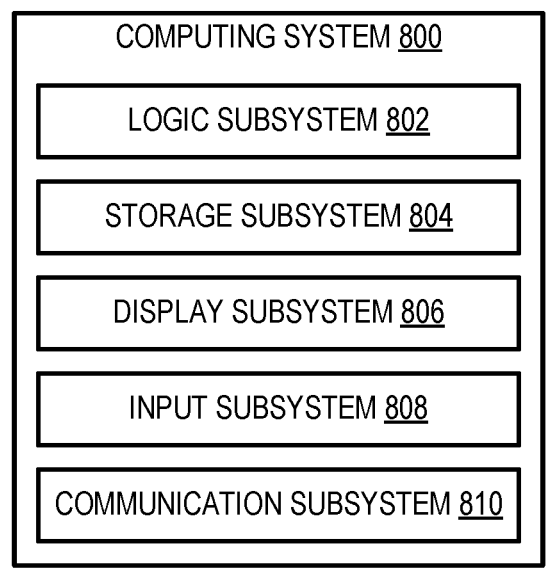
FIG. 8 schematically shows an example computing system of the present disclosure.

FIG. 8 schematically shows a simplified representation of a computing system 800 configured to provide any to all of the compute functionality described herein. For example, the computing system 800 may correspond to the tablet computing device 100 of FIGS. 1A and 1B, the large-format, touch-display computing device 200 of FIG. 2, the laptop computing device 300 of FIG. 3, the computing system 400 of FIG. 4, or another type of computing system. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem may optionally be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 800 implemented to perform a particular function. In some cases, a module may be instantiated via logic machine 802 executing instructions held by storage subsystem 804. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

In an example, a computing system comprises a touch interface including a plurality of touch sensors, the touch interface being configured to output a touch heatmap based at least on touch input detected by the plurality of touch sensors, the touch heatmap including a plurality of capacitance values corresponding to the touch input detected by the plurality of touch sensors, a logic subsystem, and a storage subsystem holding instructions executable by the logic subsystem to execute a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input, and execute a computing operation based at least on the force estimation output from the machine-learning model. In this example and/or other examples, the touch interface may be a touch-sensitive display without a force sensor. In this example and/or other examples, the touch interface may be a touchpad without a force sensor. In this example and/or other examples, the force estimation may comprise an N-length vector of estimated force values, wherein N is the number of force sensors included in the training touch interface. In this example and/or other examples, the force estimation may comprise a total estimated force value that represents a combination of force values that would be output by the plurality of force sensors of the training touch interface based at least on the touch input being provided to the training touch interface. In this example and/or other examples, the storage subsystem may hold instructions executable by the logic subsystem to pre-process the touch heatmap by geometrically mapping the touch heatmap to the training touch interface to generate a pre-processed touch heatmap that is spatially registered to the training touch interface, and wherein the machine-learning model is configured to receive the pre-processed touch heatmap and output a force estimation based at least on analyzing the pre-processed touch heatmap. In this example and/or other examples, the storage subsystem may hold instructions executable by the logic subsystem to execute a pre-processing machine-learning model configured to receive the touch heatmap, perform the geometric mapping of the touch heatmap to the training touch interface to generate the pre-processed touch heatmap and output the pre-processed touch heatmap. In this example and/or other examples, the touch interface may comprises a plurality of force sensors spatially distributed across the touch interface and configured to output a force measurement based at least on the touch input detected by the plurality of force sensors, and the storage subsystem hold may instructions executable by the logic subsystem to receive the force measurement from the plurality of force sensors, compare the force measurement with the force estimation to determine a difference value representing a difference between the force measurement and the force estimation, and based at least on the difference value being greater than a threshold difference value, adjust one or more calibration parameters of the touch interface based at least on the difference value. In this example and/or other examples, the touch interface may be configured to output a plurality of touch heatmaps corresponding to a plurality of instances of touch input to the touch interface, and the storage subsystem may hold instructions executable by the logic subsystem to associate the plurality of touch heatmaps with a user profile stored in the storage subsystem, and re-train the machine-learning model based at least on the plurality of touch heatmaps associated with the user profile. In this example and/or other examples, the machine-learning model may comprise at least one of a convolutional neural network or a fully-connected neural network.

In another example, a method for controlling operation of a computing system including a touch interface including a plurality of touch sensors comprises receiving a touch heatmap from the touch interface, the touch heatmap including a plurality of capacitance values representing touch input to the touch interface detected by the plurality of touch sensors, executing a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input, and executing a computing operation based at least on the force estimation output from the machine-learning model. In this example and/or other examples, the touch interface may be a touch-sensitive display without a force sensor. In this example and/or other examples, the touch interface is a touchpad without a force sensor. In this example and/or other examples, the force estimation may comprise an N-length vector of estimated force values, wherein N is the number of force sensors included in the training touch interface. In this example and/or other examples, the force estimation may comprise a total estimated force value that represents a combination of force values that would be output by the plurality of force sensors of the training touch interface based at least on the touch input being provided to the training touch interface. In this example and/or other examples, the method may further comprise pre-processing the touch heatmap by geometrically mapping the touch heatmap to the training touch interface to generate a pre-processed touch heatmap that is spatially registered to the training touch interface, and the machine-learning model may be configured to receive the pre-processed touch heatmap and output a force estimation based at least on analyzing the pre-processed touch heatmap. In this example and/or other examples, the method may further comprise executing a pre-processing machine-learning model configured to receive the touch heatmap, perform the geometric mapping of the touch heatmap to the training touch interface to generate the pre-processed touch heatmap and output the pre-processed touch heatmap. In this example and/or other examples, the touch interface may comprises a plurality of force sensors spatially distributed across the touch interface and configured to output a force measurement based at least on the touch input to the touch interface, and the method may further comprise receiving the force measurement from the plurality of force sensors, comparing the force measurement with the force estimation to determine a difference value representing a difference between the force measurement and the force estimation, and based at least on the difference value being greater than a threshold difference value, adjusting one or more calibration parameters of the touch interface based at least on the difference value. In this example and/or other examples, the touch interface may be configured to output a plurality of touch heatmaps corresponding to a plurality of instances of touch input to the touch interface, and the method may further comprise associating the plurality of touch heatmaps with a user profile stored in a storage subsystem of the computing system, and re-training the machine-learning model based at least on the plurality of touch heatmaps associated with the user profile.

In yet another example, a computing system comprises a touch interface including a plurality of touch sensors and a plurality of force sensors, the touch interface being configured to output a touch heatmap based at least on touch input detected by the plurality of touch sensors, the touch heatmap including a plurality of capacitance values corresponding to the touch input detected by the plurality of touch sensors, the touch interface being further configured to output a force measurement based at least on the touch input to the touch interface, a logic subsystem, and a storage subsystem holding instructions executable by the logic subsystem to execute a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input, receive the force measurement from the plurality of force sensors, compare the force measurement with the force estimation to determine a difference value representing a difference between the force measurement and the force estimation, and based at least on the difference value being greater than a threshold difference value, adjust one or more calibration parameters of the touch interface based at least on the difference value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
 a touch interface including a plurality of touch sensors, the touch interface being configured to output a touch heatmap based at least on touch input detected by the plurality of touch sensors, the touch heatmap including a plurality of capacitance values corresponding to the touch input detected by the plurality of touch sensors;
 a logic subsystem; and
 a storage subsystem holding instructions executable by the logic subsystem to:
  execute a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input; and
  execute a computing operation based at least on the force estimation output from the machine-learning model.

2. The computing system of claim 1, wherein the touch interface is a touch-sensitive display without a force sensor.

3. The computing system of claim 1, wherein the touch interface is a touchpad without a force sensor.

4. The computing system of claim 1, wherein the force estimation comprises an N-length vector of estimated force values, wherein N is the number of force sensors included in the training touch interface.

5. The computing system of claim 1, wherein the force estimation comprises a total estimated force value that represents a combination of force values that would be output by the plurality of force sensors of the training touch interface based at least on the touch input being provided to the training touch interface.

6. The computing system of claim 1, wherein the storage subsystem holds instructions executable by the logic subsystem to:
 pre-process the touch heatmap by geometrically mapping the touch heatmap to the training touch interface to generate a pre-processed touch heatmap that is spatially registered to the training touch interface, and wherein the machine-learning model is configured to receive the pre-processed touch heatmap and output a force estimation based at least on analyzing the pre-processed touch heatmap.

7. The computing system of claim 6, wherein the storage subsystem holds instructions executable by the logic subsystem to:
 execute a pre-processing machine-learning model configured to receive the touch heatmap, perform the geometric mapping of the touch heatmap to the training touch interface to generate the pre-processed touch heatmap and output the pre-processed touch heatmap.

8. The computing system of claim 1, wherein the touch interface comprises a plurality of force sensors spatially distributed across the touch interface and configured to output a force measurement based at least on the touch input detected by the plurality of force sensors, and wherein the storage subsystem holds instructions executable by the logic subsystem to:
 receive the force measurement from the plurality of force sensors;
 compare the force measurement with the force estimation to determine a difference value representing a difference between the force measurement and the force estimation; and
 based at least on the difference value being greater than a threshold difference value, adjust one or more calibration parameters of the touch interface based at least on the difference value.

9. The computing system of claim 1, wherein the touch interface is configured to output a plurality of touch heatmaps corresponding to a plurality of instances of touch input to the touch interface, and wherein the storage subsystem holds instructions executable by the logic subsystem to:
 associate the plurality of touch heatmaps with a user profile stored in the storage subsystem; and
 re-train the machine-learning model based at least on the plurality of touch heatmaps associated with the user profile.

10. The computing system of claim 1, wherein the machine-learning model comprises at least one of a convolutional neural network or a fully-connected neural network.

11. A method for controlling operation of a computing system including a touch interface including a plurality of touch sensors, the method comprising:
 receiving a touch heatmap from the touch interface, the touch heatmap including a plurality of capacitance values representing touch input to the touch interface detected by the plurality of touch sensors;

executing a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input; and executing a computing operation based at least on the force estimation output from the machine-learning model.

12. The method of claim 11, wherein the touch interface is a touch-sensitive display without a force sensor.

13. The method of claim 11, wherein the touch interface is a touchpad without a force sensor.

14. The method of claim 11, wherein the force estimation comprises an N-length vector of estimated force values, wherein N is the number of force sensors included in the training touch interface.

15. The method of claim 11, wherein the force estimation comprises a total estimated force value that represents a combination of force values that would be output by the plurality of force sensors of the training touch interface based at least on the touch input being provided to the training touch interface.

16. The method of claim 11, further comprising:

pre-processing the touch heatmap by geometrically mapping the touch heatmap to the training touch interface to generate a pre-processed touch heatmap that is spatially registered to the training touch interface, and wherein the machine-learning model is configured to receive the pre-processed touch heatmap and output a force estimation based at least on analyzing the pre-processed touch heatmap.

17. The method of claim 16, further comprising:

executing a pre-processing machine-learning model configured to receive the touch heatmap, perform the geometric mapping of the touch heatmap to the training touch interface to generate the pre-processed touch heatmap and output the pre-processed touch heatmap.

18. The method of claim 11, wherein the touch interface comprises a plurality of force sensors spatially distributed across the touch interface and configured to output a force measurement based at least on the touch input to the touch interface, and wherein the method further comprises:

receiving the force measurement from the plurality of force sensors;

comparing the force measurement with the force estimation to determine a difference value representing a difference between the force measurement and the force estimation; and based at least on the difference value being greater than a threshold difference value, adjusting one or more calibration parameters of the touch interface based at least on the difference value.

19. The method of claim 11, wherein the touch interface is configured to output a plurality of touch heatmaps corresponding to a plurality of instances of touch input to the touch interface, and wherein the method further comprises:

associating the plurality of touch heatmaps with a user profile stored in a storage subsystem of the computing system; and re-training the machine-learning model based at least on the plurality of touch heatmaps associated with the user profile.

20. A computing system comprising:

a touch interface including a plurality of touch sensors and a plurality of force sensors, the touch interface being configured to output a touch heatmap based at least on touch input detected by the plurality of touch sensors, the touch heatmap including a plurality of capacitance values corresponding to the touch input detected by the plurality of touch sensors, the touch interface being further configured to output a force measurement based at least on the touch input to the touch interface;

a logic subsystem; and a storage subsystem holding instructions executable by the logic subsystem to:

execute a machine-learning model configured to receive the touch heatmap and output a force estimation of the touch input detected by the plurality of touch sensors based at least on analyzing the touch heatmap, wherein the machine-learning model is trained based at least on training data generated by a training touch interface including a plurality of force sensors spatially distributed across the training touch interface, wherein the training data includes a plurality of training touch heatmaps representing a plurality of different instances of training touch input to the training touch interface and a corresponding set of force values output by the plurality of force sensors based at least on the plurality of different instances of training touch input;

receive the force measurement from the plurality of force sensors;

compare the force measurement with the force estimation to determine a difference value representing a difference between the force measurement and the force estimation; and based at least on the difference value being greater than a threshold difference value, adjust one or more calibration parameters of the touch interface based at least on the difference value.

* * * * *